(12) United States Patent
Bader

(10) Patent No.: US 9,041,288 B2
(45) Date of Patent: May 26, 2015

(54) STABILIZED HIGH-VOLTAGE POWER SUPPLY

(71) Applicant: AMPEGON AG, Turgi (CH)

(72) Inventor: Michael Bader, Arni AG (CH)

(73) Assignee: AMPEGON AG, Turgi (CH)

( * ) Notice: Subject to any disclaimer, the term of this patent is extended or adjusted under 35 U.S.C. 154(b) by 329 days.

(21) Appl. No.: 13/647,662

(22) Filed: Oct. 9, 2012

(65) Prior Publication Data

US 2014/0097747 A1 Apr. 10, 2014

(51) Int. Cl.
| | |
|---|---|
| H01J 23/16 | (2006.01) |
| H01J 29/96 | (2006.01) |
| H01J 23/34 | (2006.01) |
| H01J 25/02 | (2006.01) |
| H02J 1/08 | (2006.01) |
| H02M 1/00 | (2006.01) |

(52) U.S. Cl.
CPC .............. *H01J 23/34* (2013.01); *H01J 25/025* (2013.01); *H02J 1/08* (2013.01); *H02M 2001/0003* (2013.01); *H02M 2001/007* (2013.01); *H02M 2001/0077* (2013.01)

(58) Field of Classification Search
USPC ............................................................ 315/3
See application file for complete search history.

(56) References Cited

U.S. PATENT DOCUMENTS

| | | | |
|---|---|---|---|
| 5,440,202 A * | 8/1995 | Mathews et al. .................... 315/3 |
| 5,498,414 A * | 3/1996 | Thornton et al. ........... 424/234.1 |
| 8,618,692 B2 * | 12/2013 | Adest et al. ...................... 307/58 |
| 8,749,244 B2 * | 6/2014 | Hauser ........................... 324/426 |
| 8,842,451 B2 * | 9/2014 | Phadke et al. .................... 363/37 |
| 8,872,384 B2 * | 10/2014 | Stratakos et al. ............. 307/104 |
| 2008/0150366 A1 * | 6/2008 | Adest et al. ...................... 307/77 |
| 2010/0305770 A1 * | 12/2010 | Bhowmik et al. ............. 700/295 |
| 2014/0097747 A1 * | 4/2014 | Bader ................................ 315/3 |

FOREIGN PATENT DOCUMENTS

| | | |
|---|---|---|
| DE | 102009028973 A1 | 3/2011 |
| EP | 1553686 A1 | 7/2005 |

(Continued)

OTHER PUBLICATIONS

Fernandez A et al: "Performance of the TJ-II ECRH system with the new -80kV 50A high voltage power supply", Fusion Engineering and Design, Elsevier Science Publishers, Amsterdam, NL, vol. 84, No. 2-6, Jun. 1, 2009, pp. 772-775.

(Continued)

*Primary Examiner* — Adam Houston
(74) *Attorney, Agent, or Firm* — Michael Best & Friedrich LLP

(57) ABSTRACT

A stabilized high-voltage power supply is disclosed, having a general setup similar to a pulse-step modulator. The power supply comprises a plurality of DC power modules (40) having their outputs connected in a series configuration. Each power module comprises a DC voltage source (41), a DC-DC converter (42), and an output switching circuit (43). The total output voltage of the power supply is regulated by regulating the DC link voltage at the output of each power module. This is achieved by an appropriate feedback control circuit driving the DC-DC converter of each power module. In this manlier, low output ripple and a rapid response to changes in output current can be achieved. The power supply may be used, e.g., as the cathode power supply of a gyrotron.

15 Claims, 4 Drawing Sheets

(56) References Cited

FOREIGN PATENT DOCUMENTS

| EP | 1622248 | A2 | 2/2006 |
|---|---|---|---|
| EP | 2099127 | A1 | 9/2009 |

OTHER PUBLICATIONS

Office Action received in European Patent Application No. 10 405 184.2, mailed May 22, 2014.
Extended Search Report from the European Patent Office for Application No. 10405184 dated Mar. 28, 2011 (7 pages).
Crews, "LM5032—Interleaved BoostConverter," National Semiconductor—Application note 1820, May 22, 2008, pp. 1-10, XP002629113, Retrieved from Internet on Mar. 18, 2011 <URL: http://www.national.com/an/AN/AN-1820.pdf.
Alex et al., "A new klystron modulator for XFEL based on PSM technology", Proceedings of PAC07, Albuquerque, New Mexico, USA (2007).
Alex et al.,"A new prototype modulator for the European XFEL Project in pulse step modulator technology", Proceedings of PAC09, Vancouver, BC, Cariada, May 4-8, 2009.

\* cited by examiner

STABILIZED HIGH-VOLTAGE POWER SUPPLY

TECHNICAL FIELD

The present invention relates to a high-voltage power supply comprising a plurality of DC power modules connected in series, each module providing a DC link voltage that may be selectively switched. This general setup is often called a "pulse-step modulator" (PSM).

PRIOR ART

Pulse-step modulators are widely used as voltage supplies for high-power vacuum tubes in various applications, in particular, as modulation amplifiers in AM transmitters or radar systems. An early example of a pulse-step modulator is disclosed, e.g., in EP 0 066 904.

A typical prior-art pulse-step modulator is illustrated in FIG. 1. The modulator comprises a plurality of identical DC power modules 10 connected to the secondaries of a multi-secondary transformer 14. Each module comprises a rectifier circuit 11 and a smoothing capacitance 12 for providing a DC link voltage, and a switching circuit 13 for selectively providing the DC link voltage to the output of the module. A free-wheeling diode in each switching circuit ensures that an unidirectional current may flow through each module even when the output switch of the module is open.

The total output voltage $V_{tot}$ of such a PSM-type power supply can be modulated by switching the DC link voltages to the outputs of the modules 10 in an on/off fashion. This provides a rather coarse, step-wise modulation of the total output voltage, the steps being determined by the individual output voltages of the modules ("coarse-step modulation", CSM). For more accurate control, pulse-width modulation (PWM) at the outputs of the modules is often additionally employed. Intricate switching schemes have been suggested to ensure that the power load is distributed equally over the modules, and to increase the effective PWM frequency without increasing the actual switching frequency of each module. Since PWM occurs at much higher frequencies than the mains frequency, PWM is also usually employed to remove voltage ripple at multiples of the mains frequency. Whereas PWM allows for a very accurate control of the total output voltage, any PWM switching scheme requires a PWM output filter to eliminate voltage ripple at the PWM frequency.

One potential application of a PSM-type power supply is its use as the cathode power supply (main power supply, MPS) of a gyrotron. A gyrotron is a particular type of vacuum tube, which emits millimeter-wave electromagnetic radiation. Typical beam output powers range from some tens of kilowatts well into the megawatt range. Gyrotrons are used, inter alfa, in nuclear fusion research to heat plasmas.

A gyrotron typically comprises an electron gun, an acceleration chamber, a resonance cavity immersed in a strong magnetic field, and an electron collector. An electron beam is accelerated to relativistic energies and subjected to the magnetic field. The electrons gyrate around the magnetic field lines and emit electromagnetic radiation. By interaction of the relativistic electrons with the radiation field, amplification of the electromagnetic radiation occurs. Gyrotrons are as such well known and are available commercially from a variety of manufacturers.

A gyrotron, together with a typical configuration of its power supplies, is illustrated in highly schematic form in FIG. 2. A typical gyrotron comprises a filament F heating a cathode K for emitting electrons. The electrons are accelerated in the acceleration chamber past an anode A and past a body electrode B to reach the resonance cavity. The electrons finally hit a collector C, which is typically kept at a lower potential than the body electrode to decelerate the electrons ("depressed collector"). Several power supplies are employed to operate the gyrotron. A filament power supply FPS powers the filament F. A cathode power supply MPS provides a negative voltage between the collector C and the cathode K, this voltage being in the range of several tens of kilovolts. A body power supply BPS provides a positive voltage, which is also typically in the range of a few tens of kilovolts, between the collector C and the body electrode B. An anode power supply APS allows to selectively switch a voltage between the cathode K and the anode A to modulate the beam current. Other configurations of electrodes and power supplies have been suggested, which however need not be discussed here.

An extremely important parameter for the operation of the gyrotron is the so-called beam voltage between the cathode K and the body electrode B. The electrons are accelerated between the cathode and the body electrode by this voltage, i.e., the kinetic energy of the electrons and therefore their relativistic mass increase is determined by this voltage. Through the relativistic mass increase, this voltage influences the cyclotron frequency of the electrons. Since the cavity of a gyrotron typically has a high quality factor Q, already small variations in the cyclotron frequency can dramatically influence the output power of the gyrotron. The beam voltage should therefore be as accurate as possible and should have as little ripple as possible.

In the configuration of FIG. 2, the quality of the beam voltage is determined both by the quality of the cathode power supply MPS and of the body power supply BPS. Whereas the current load on the body power supply BPS is relatively low (typically in the range of a few tens of milliamperes), the current load on the cathode power supply MPS is typically in the range of several tens of amperes. In addition, the cathode power supply MPS must be capable of rapidly responding to large, rapid current changes while maintaining the beam voltage at a predetermined value as accurately as possible. This presents a considerable challenge to the successful design of a cathode power supply.

In particular, if PWM is employed for regulating the MPS output voltage, the PWM output filter must be designed to ensure both a rapid response to a change in current load and a low voltage ripple due to PWM. These two requirements are difficult if not impossible to satisfy simultaneously. Furthermore, parasitic capacitances of the transformer may propagate the PWM frequency and its harmonics back into the mains grid, which may lead to EMC problems.

If, on the other hand, only coarse-step modulation is used without employing PWM, considerable ripple from the mains may result, and voltage regulation can only occur stepwise.

In J. Alex et al., "A new klystron modulator for XFEL based on PSM technology", Proceedings of PAC07, Albuquerque, N. Mex., USA (2007), a particular type of PSM has been suggested to drive a klystron tube. A plurality of DC power modules are connected in series. Each module comprises a rectifier with a smoothing capacitance, followed by a boost converter (step-up converter), acting as a constant power converter to charge a large output capacitance (20 mF). The voltage across the output capacitance can be selectively connected to the output of the module by an output switching circuit. The power supply acts to provide short high-voltage pulses to a load (specifically, a klystron connected to the power supply via a pulse transformer). During each pulse, power is drawn from the output capacitances of the modules. Consequently, the voltage at the output of each module drops significantly during each pulse. Subsequently the output capacitance of each module is recharged by the boost converter. The boost converter is controlled in a manner to ensure that constant power is drawn from the mains supply to keep power variations ("flicker") on the mains grid due to the pulses as low as possible.

A further development of this type of power supply is disclosed in J. Alex et al., "A new prototype modulator for the European XFEL Project in pulse step modulator technology", Proceedings of PAC09, Vancouver, BC, Canada, May 4-8, 2009. Again, each module employs a boost converter to ensure constant power consumption on the mains supply. Pulse-width modulation is employed to compensate for the voltage droop on the storage capacitance during the pulse in order to improve the flatness of the pulse.

A high-voltage power supply of the same general type, wherein each module comprises a boost converter acting as a constant-power converter; is also disclosed in EP 2 099 127 A1.

These power supplies cannot overcome the deficiencies noted above in connection with the more traditional kinds of PSM power supplies if both a rapid response to current changes and low voltage ripple are needed, since stabilization of the total output voltage still either requires PWM or, in the alternative, can be only carried out stepwise.

SUMMARY OF THE INVENTION

It is therefore an object of the present invention to provide a high-voltage power supply that is capable of providing a stable total output voltage having low voltage ripple while being able to handle large, rapid current changes.

This object is achieved by a high-voltage power supply as specified in claim 1. The invention further provides a method of operation of such a power supply, as laid down in claim 11, a method of use as laid down in claim 13, and a gyrotron employing such a power supply as laid down in claim 14. Further embodiments of the invention are laid down in the dependent claims.

According to the present invention, a high-voltage power supply is provided, comprising:
- a plurality of DC power modules having their outputs connected in a series configuration,
- each power module comprising a DC voltage source, a DC-DC converter receiving an input voltage from said DC voltage source and providing a DC link voltage, and an output switching circuit for selectively connecting said DC link voltage to the output of said power module,
- characterized in that the power supply comprises, for each DC power module, a feedback control circuit operable to provide driving signals to the DC-DC converter of said power module in a manner that regulates said DC link voltage to a predetermined reference voltage.

Therefore, in contrast to the prior art, the DC-DC converter is not operated to ensure that constant power is drawn from the DC voltage source of the module, but it is operated as a voltage regulator, ensuring that the DC link voltage takes a predetermined reference value. The reference voltages of all involved modules are preferably identical, such that the total output voltage of the power supply is the reference voltage, multiplied by the number of modules involved.

Each module will therefore normally comprise a DC link voltage sensor for measuring the DC link voltage, and the feedback control circuit will normally receive the measured DC link voltage from the sensor, optionally process the measured voltage (e.g., by subjecting it to a low-pass filter), and compare it to the (optionally also pre-processed) reference voltage. A difference signal will be fed to a suitable controller, e.g., a PI or PID controller. The controller output will be fed to an actuator, which calculates the driving signals for the DC-DC converter.

Advantageously, when deriving the driving signals, the actuator may directly take into account the major disturbance variables of the control loop, in particular, the actual output current of the power modules and/or the actual input voltage of the power modules. In this manner, a very rapid response to changes in these disturbance variables may be achieved. In particular, the power supply may comprise at least one current sensor for measuring an output current of said DC power modules, and the feedback control circuit may then be adapted to derive driving signals for the DC-DC converter of each power module taking into account the measured output current. A single current sensor for the complete power supply may be sufficient; however, it is preferred that each module comprises its own current sensor. Furthermore, each power module may comprise an input voltage sensor for determining an input voltage of its DC-DC converter, and the voltage control circuit may then be adapted to derive driving signals for the DC-DC converter of each power module taking into account the measured input voltage. The DC-DC converter will normally be a switched converter operable at a variable duty cycle. The feedback control circuit may then be adapted to calculate the duty cycle taking into account the measured disturbance variables, i.e.; the measured output current and/or the measured input voltage, and to operate the DC-DC converter at that duty cycle. A possible formula for the duty cycle in the case of a boost converter will be given in section "Detailed Description of Preferred Embodiments" below; however, other relationships taking into account these disturbance variables are also conceivable.

Preferably, the DC-DC converter of each power module is a boost converter. However, it is conceivable to employ any other type of switched DC-DC converter, such as, e.g., a buck converter, a buck-boost converter, or a SEPIC. For practical reasons, it is preferred that the converter is capable of delivering an output voltage that is higher than the input voltage, which would render buck converters less preferred. Since it is furthermore preferred to minimize any losses, a boost converter with its simple topology is the preferred converter type.

A boost converter comprises at least one output capacitance and at least one converter switching element cooperating with at least one choke inductance and at least one diode (or any other unidirectional switching element) to charge the output capacitance to the DC link voltage. The feedback control circuit is then operable to control the DC link voltage by switching the converter switching element at a variable duty cycle.

An interleaved topology of the boost converter may be chosen to reduce AC currents in the input and output capacitances, and to further reduce voltage ripple. The boost converter of each power module may therefore comprise at least two interleaved boost converter circuits adapted to charge a common output capacitance. The control circuit is preferably operable to operate the interleaved boost converter circuits in a synchronous but phase-shifted manner.

In a concrete setup, such an interleaved boost converter topology may comprise at least one common output capacitance, at least one first converter switching element (possibly two or more such elements connected in series) cooperating with at least one first choke inductance (possibly two or more such inductances in a series configuration with the first switch elements) and diode (possibly two or more diodes in a series configuration with the first choke inductances) to charge said output capacitance to the DC link voltage, and at least one second converter switching element (possibly two or more such elements connected in series) cooperating with at least one second choke inductance (possibly two or more such inductances in a series configuration with the second switch elements) and diode (possibly two or more diodes in a series configuration with the second choke inductances) to charge the same output capacitance. The control circuit is then operable to control the DC link voltage by driving the first and second converter switching elements at a variable duty cycle, preferably in a synchronous but phase-shifted manner.

In order to ensure a rapid response to current changes and to reduce switching losses, the control circuit preferably operates the boost converter of each power module in discontinuous mode during voltage regulation. This can be ensured by appropriately choosing the choke inductance to be lower than the so-called critical choke inductance in the intended operating regime of the module. An example for the calculation of the critical choke inductance is provided below in section "Detailed Description of Preferred Embodiments".

The control circuits of the individual modules may be commonly controlled by a main control system for the modules. In particular, the overall step-response behavior of the power supply to disturbances such as current changes may be improved by driving the DC-DC converters of different DC power modules in a synchronous but phase-shifted manner. In this manner, the DC-DC converters of some modules in the appropriate phase within the converter cycle time can react to disturbances earlier than those lagging behind in phase.

Preferably, the total output voltage of the power supply during each time period in which the power supply is supposed to deliver a certain predetermined, non-zero voltage value ("voltage pulse") is regulated by only controlling the DC-DC converters of the individual power modules, without applying coarse-step modulation, and without applying pulse-width modulation. In other words, the modules are preferably operated in a manner in which the output switching circuits of all power modules remain in the same (active or passive) state over prolonged times, in particular, as long as the desired total output voltage remains unchanged, unless a fault condition occurs. Such time periods will normally cover at least 10, often at least 50 switching cycles of the DC-DC converter. They can last, e.g., from less than 1 ms to several seconds or even longer.

In order to enable a rapid discharge of the output capacitance in cases such as a missing load, each DC power module may comprise a discharge resistor and a discharge switch for selectively discharging the output capacitance.

In preferred embodiments, the power source may comprise at least one multi-secondary transformer having a plurality of sets of secondary windings, and each DC power module may then comprise a rectifier circuit connected to one set of secondary windings. The DC voltage source of each module may thus be considered to comprise this set of secondary windings and the corresponding rectifier circuit. Alternatively, a separate transformer may be used for each module. Depending on the field of application, it is even conceivable to use other kinds of DC voltage sources, even batteries.

To improve power ratio, the high-voltage power supply may comprise a first and a second multi-secondary transformer, the first transformer and the second transformer being configured to provide secondary voltages that are phase-shifted between the transformers. In the case of a three-phase mains grid, this may be accomplished, e.g., by using a star-star configuration for the first transformer and a delta-star configuration for the second transformer, resulting in twelve-pulse rectification. Other suitable schemes for achieving a phase shift are well known in the art.

The present invention also provides a method of operating a high-voltage power supply as described above. The method comprises, for each power module;
  setting the reference voltage;
  measuring and processing the actual DC link voltage;
  comparing the DC link voltage and the reference voltage to derive a difference signal;
  from the difference signal, deriving an actuating signal;
  measuring an actual output current and/or the actual input voltage;
  from the actuating signal, deriving driving signals for the DC-DC converter, taking into account the measured output current and/or input voltage; and
  driving each DC-DC converter by said driving signals to actively control said output voltage.

In particular, as outlined above, the driving signals may implement a duty cycle determined, inter alia, by the actuating signal, the output current and the input voltage.

The high-voltage power supply described above may advantageously be used as a power supply for a gyrotron, in particular, as its cathode power supply. Accordingly, the present invention also relates to a gyrotron. Generally, a gyrotron has at least a cathode, a body electrode, and a collector electrode, and advantageously the power supply is connected between the cathode and the collector electrode.

While a particular application for a gyrotron has been described, there are also other fields of applications where a highly stable high-voltage power supply capable of handling rapid current changes is needed, and the power supply of the present invention may be employed in such other fields as well.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 3:
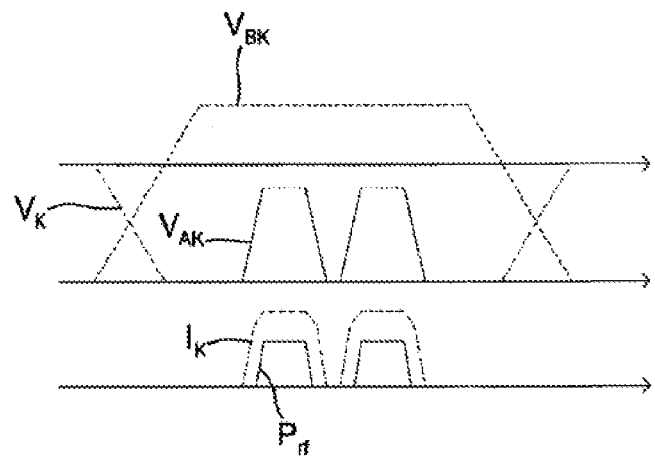
FIG. 3 shows, in a highly schematic fashion and not to scale, a typical sequence of voltages, currents and rf power in a gyrotron.

FIG. 3 illustrates, in a highly schematic fashion and not to scale, a typical sequence of the various voltages and currents involved in the operation of a gyrotron. At the beginning of the sequence, the cathode power supply MPS and the body power supply BPS are switched to their nominal output voltages to provide a predetermined beam voltage $V_{BK}$. Both voltages are actively controlled to ensure stability of these voltages. The anode-cathode voltage $V_{AK}$ provided by the anode power supply APS is initially kept at a value which avoids any significant beam current between the cathode K and the collector C. Only when the gyrotron is to generate electromagnetic radiation, the anode-cathode voltage $V_{AK}$ is switched to a positive value, leading to a rapid rise of the beam current $I_K$ and to the emission of electromagnetic radiation with power $P_{rf}$.

From this diagram it is apparent that the cathode power supply MPS must be capable of rapidly reacting to large variations in beam current $I_K$ while providing a stable output voltage with low voltage ripple.

Figure 1:
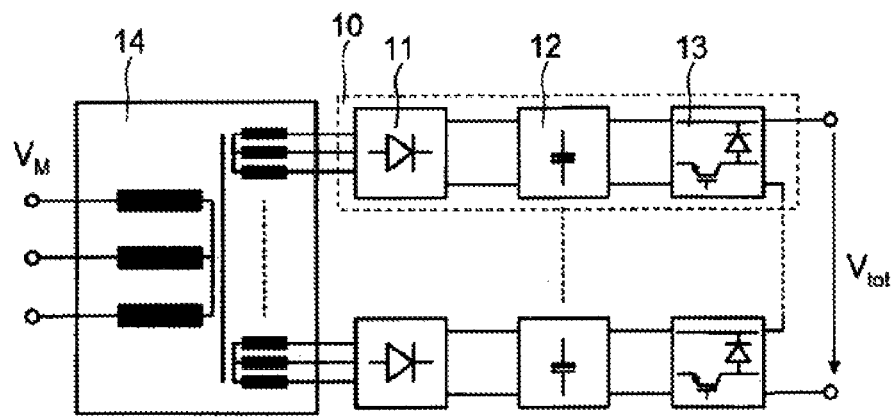
FIG. 1 shows a schematic block diagram of a PSM power supply according to the prior art.
Figure 2:
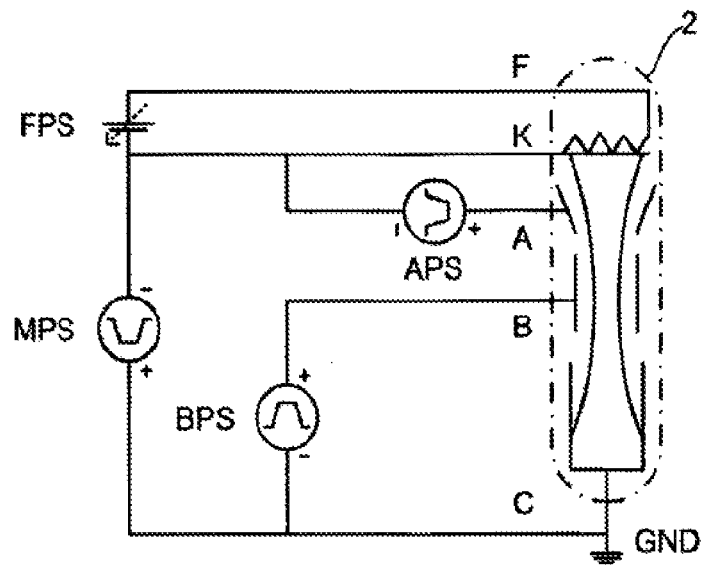
FIG. 2 shows a highly schematic sketch of a typical gyrotron together with its associated power supplies.
Figure 4:
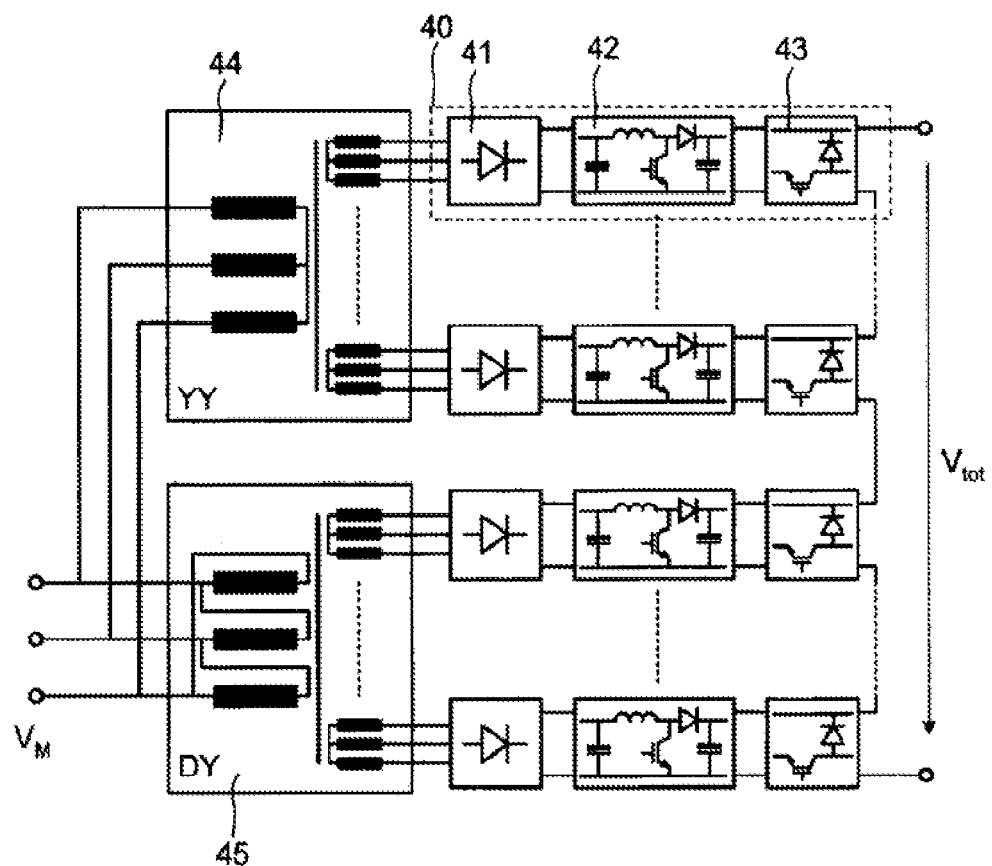
FIG. 4 shows a schematic block diagram of a power supply according to the present invention.

FIG. 4 shows a simplified block diagram of a high-voltage power supply according to the present invention, which is adapted to satisfy these requirements. The general setup is similar to the setup of FIG. 1. However, instead of one single multi-secondary transformer, in the present example two multi-secondary transformers 44, 45 in different configurations (YY vs. DY) are used to improve overall power factor. Both transformers 44, 45 are fed by a three-phase mains voltage $V_M$. The three primary windings of the first transformer 44 are connected in a star ("Y") configuration, while the three primary windings of the second transformer 45 are connected in a delta ("D") configuration. Each transformer comprises a plurality of sets of three secondaries (typically 20-30 such sets), each set being connected in a star configuration. Overall, the first transformer 44 thus has a star-star ("YY") configuration, while the second transformer has a delta-star ("DY") configuration. By this overall configuration of the two transformers 14, 15, the secondary voltages of the two transformers are appropriately phase-shifted with respect to each other to achieve twelve-pulse rectification, which leads to a high power factor of typically more than 0.95.

The power supply comprises a plurality of identical DC power modules 40 connected to the secondaries of the transformers 44, 45. Each DC power module comprises a rectifier circuit 41, a boost converter 42, and an output switching circuit 43. The outputs of the modules 40 are connected in a series configuration.

Figure 5:
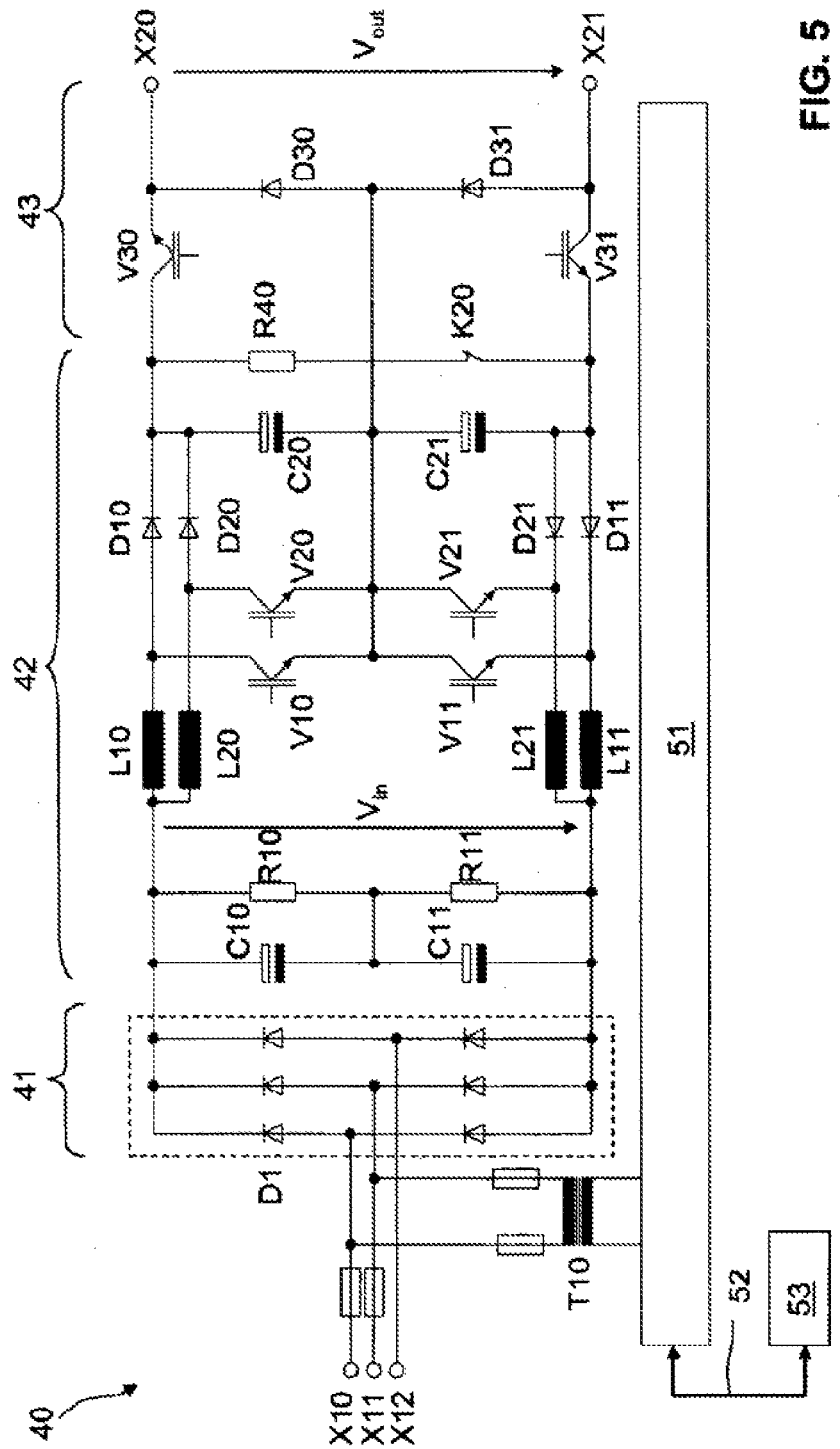
FIG. 5 shows a simplified circuit diagram of a single module of the power supply of FIG. 4.

FIG. 5 shows a simplified circuit diagram for a single module 40, which will now be described in more detail.

Input terminals X10, X11, X12 are connected to a set of three secondaries of one of the transformers 44, 45. The rectifier circuit 41 in the form of a full-bridge rectifier, consisting of six diodes D1, rectifies the three-phase secondary voltage.

The boost converter 42 comprises two interleaved boost converter circuits having a common input capacitance and charging a common output capacitance, each of the interleaved converter circuits being in turn designed with two switching elements in series to reduce the required voltage rating of each switching element. In more detail, the common input capacitance of the boost converter is formed by a network of capacitors C10, C11, connected in series to enable the use of capacitors having a reduced voltage rating, and symmetrizing resistors R10, R11 in parallel to the two capacitors. The voltage across this input capacitance is called the input voltage $V_{in}$. The common output capacitance of the boost converter is formed by two series-connected capacitors C20, C21. Each of the upper and lower terminals of the output capacitance is connected to the input capacitance via two groups of elements consisting of a series-connected choke inductance and diode each, the two groups being connected in parallel. The diodes are forward-biased to allow energy to flow from the input capacitance through the choke inductances into the output capacitance, but not in the reverse direction from the output capacitance back into the input capacitance. Two pairs of series-connected actively controlled converter switches V10, V11 and V20, V21, respectively, here in the form of IGBTs, connect the connection node between an upper choke inductance and upper diode with the connection node between a lower choke inductance and lower diode. By closing these switches, current can flow through these choke inductances while the output capacitance is bypassed. As a result, the upper and lower choke inductance together are subjected to the input voltage, and inductive energy builds up in the choke inductances due to this voltage. When the switches are opened again, the stored energy in the choke inductances is transferred to the output capacitance through the diodes. The resulting output voltage (DC link voltage) $V_{out}$ across the output capacitance can be much larger than the input voltage. This principle of operation of a boost converter is as such well known in the art.

A discharge resistor R40 and a switch K20 enable a rapid discharge of the output capacitance if needed. Output switches V30, V31 in the form of IGBTs selectively provide the DC link voltage $V_{out}$ to the output terminals X20, X21 of the module. Two reverse-biased, series-connected freewheeling diodes D30, D31 enable a unidirectional current to flow between the output terminals even when the output switches V30, V31 are open. The common node between the two diodes D30, D31 is connected to the common node between the converter switches V10, V11 and V20, V21, respectively, of each pair of these switches as well as to the common node between the capacitors C20, C21 to provide improved symmetrization. Additional symmetrization resistors (not shown in FIG. 5) may optionally be provided in parallel to the capacitors C20, C21.

A module controller 51 is fed from input terminals X10, X11 via a small transformer T10. Control signals and diagnostic signals are exchanged between the module controller 51 and an external main control system 53 via a fiber-optic link 52 ensuring galvanic isolation. The module controller 51 controls the booster switches V10, V11, V20, V21, the discharge switch K20, and the output switches V30, V31 via leads that have been omitted in FIG. 5 for the sake of clarity. In the present example, all switches are implemented as semiconductor switches, in particular, as IGBTs, which will usually be equipped with additional reverse-biased freewheeling diodes in parallel to the collector-emitter path (not shown). However, other types of actively controlled semiconductor switches may be employed, depending on the actual load requirements, such as power MOSFETs etc.

The power supply is operated as follows: Depending on the desired total output voltage $V_{tot}$ and on the status of the modules, the main control system selects whether all or only a part of the modules shall be involved in providing the desired total output voltage $V_{tot}$. The main control system accordingly provides control signals to the module controllers 51 of the individual modules via the fiber-optic link 52. Each module controller drives the converter switches V10-V21 of its associated module to charge the output capacitance C20, C21 to a reference DC link voltage $V_{ref}$ determined by the main control system. This reference voltage is set to the same value in all modules. It corresponds to the desired total output voltage $V_{tot}$ divided by the number of involved modules. The output switches of the involved modules are then closed to provide the DC link voltages of the modules to their outputs, so as to provide the sum of the DC link voltages at the output of the power supply. During normal operation, and in particular during individual current pulses delivered by the power supply, the output switches remain closed and are not operated, in contrast to prior-art devices, where PWM is implemented at the output switches to provide voltage regulation. Instead, regulation of the total output voltage is carried out by regulating the DC link voltages $V_{out}$ supplied by the boost converters in a feedback control circuit implemented in module controller 51.

Figure 6:
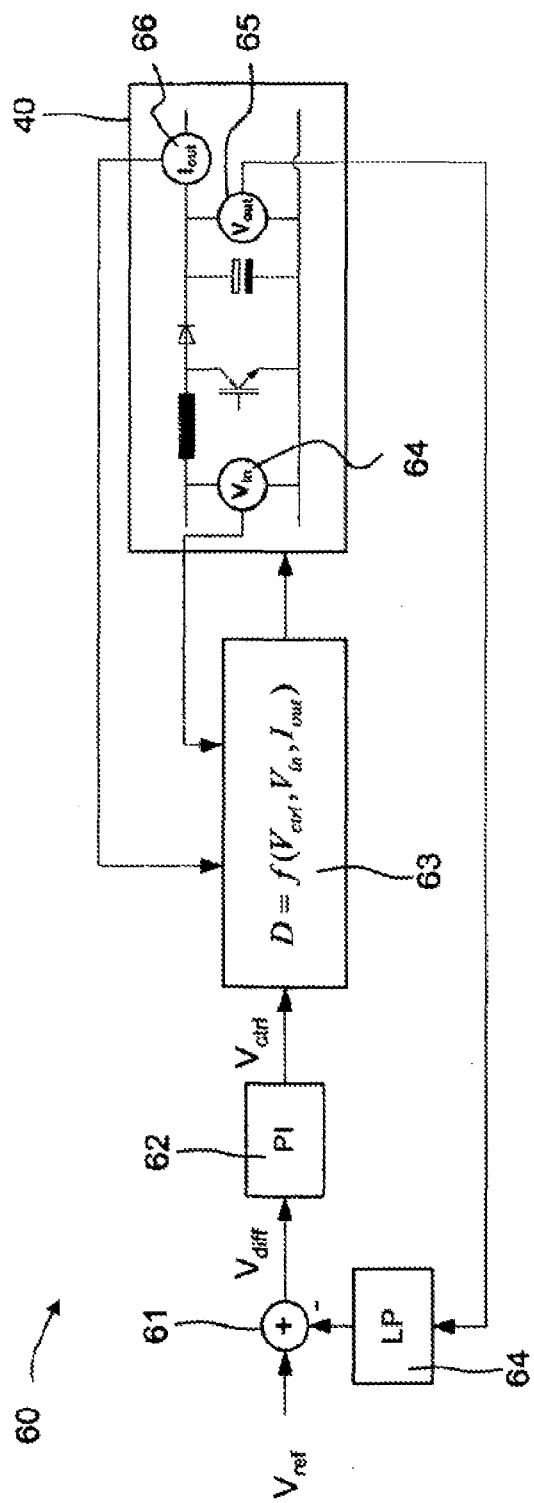
FIG. 6 shows a diagram illustrating the control loop for controlling the output voltage of a module as shown in FIG. 5.

The feedback control circuit 60 is illustrated schematically in FIG. 6. The actual DC link voltage $V_{out}$ (in terms of control theory, the controlled variable of the control loop) is determined by a suitable voltage sensor 65. The measured DC voltage is subjected to a low-pass filter 64 to filter out the switching frequency of the boost converter and its harmonics, and the filtered DC link voltage is compared to the reference voltage $V_{ref}$ in a comparator 61. The difference $V_{diff}$ of these two voltages is fed to a PI controller 62, whose controller output signal $V_{ctrl}$ (in terms of control theory, the actuating variable of the control loop) is fed to a calculating unit 63 (the actuator of the control loop). An input voltage sensor 64 measures the input voltage $V_{in}$, and an output current sensor measures the output current $I_{out}$. These signals (corresponding to the main disturbance variables of the control loop) are also fed to the calculating unit 63. From the controller signal $V_{ctrl}$, from the input voltage $V_{in}$ and from the output current $I_{out}$, the calculating unit 63 calculates a duty cycle (i.e., the ratio of the time during which the switches of the converter are closed and the cycle time of the converter) and drives the converter switches V10-V21 according to this duty cycle.

The controlled variable $V_{out}$ is a quadratic function of the duty cycle. In order to achieve a linear control path, the duty cycle should therefore be a square root function of the actuating variable $V_{ctrl}$. In this manner, a linear dependence between controller signal $V_{ctrl}$ (actuating variable) and DC link voltage $V_{out}$ (controlled variable) results. As will be detailed further below, the boost converter is preferably operated in discontinuous mode (i.e., the current in the booster choke inductances substantially decreases to zero before the next booster cycle starts). The duty cycle in discontinuous mode may be calculated according to the following formula:

$$D = \sqrt{\frac{2 \cdot I_{out} \cdot L_{booster} \cdot (V_{ctrl} - V_{in})}{T_{booster} \cdot V_{in}^2}}.$$ (Equation 1)

Here, $T_{booster}$ is the booster cycle time (the inverse of the boost converter operating frequency, which is kept constant during operation), and $L_{booster}$ is the total choke inductance of the boost converter (in the specific arrangement illustrated here, $L_{booster}$=L10=L11=L20=L21). Both pairs of converter switches in the interleaved converter circuits are operated at the same duty cycle, but phase-shifted by 180° relative to each other.

An important property of the calculating unit is that the most important disturbance variables, $I_{out}$ and $V_{in}$, directly act on the actuator of the control loop. For example, in the case of a sudden rise of the output load, the output current will also rise rapidly, while the DC link voltage will drop slowly due to the presence of the large output capacitance. Since the increased output current directly acts on the actuator, the duty cycle will be increased almost instantaneously, and the voltage drop will stop within a single booster cycle time $T_{booster}$. The PI controller can now correct the (relatively small) voltage drop that has already occurred.

In order to ensure a rapid response to load changes, the boost converter should be operated in discontinuous mode during normal operation. This measure also improves stability of the regulation of the DC link voltage, and minimizes switching losses on the converter switches, since these are always switched on at zero current. This poses certain restrictions on the booster choke inductances. In particular, the total choke inductance should not exceed a certain critical value, which is well known in the art and depends on the desired operating point as follows:

$$L_{crit} = \frac{V_{in}^2 \cdot (V_{out} - V_{in}) \cdot T_{booster}}{2 \cdot I_{out} V_{out}^2}.$$ (Equation 2)

On the other hand, the choke inductance should not be too small in order to keep the input current to low figures. This calls for a choice of choke inductance below but close to the critical choke inductance $L_{crit}$.

The PI controller 62 can be disabled selectively in certain situations where feedback control would be inappropriate. One such situation is the case of a missing output load (no-load case), if at the same time the DC link voltage $V_{out}$ is higher than the reference voltage $V_{ref}$. While the controller is disabled, the output capacitance may be discharged down to the reference voltage by closing the discharge switch K20. Once the reference voltage $V_{ref}$ is reached again, the controller is enabled again.

In order to enable controlled ramp-up of the output voltage in the no-load case, e.g., after a positive change of the reference voltage $V_{ref}$, particular measures are required, since Equation (1) implies that the duty cycle will be zero as long as the output current is zero. In order to overcome this problem, it is possible to set the current in Equation (1) to some predetermined minimum value (e.g., 1-2% of the maximum output current) if the actual measured output current is smaller than this minimum value.

Particular measures are required for power-up. A possible power-up sequence may be implemented as follows: The input capacitance C10, C11 and the output capacitance C20, C21 are initially charged to the nominal voltage of $V_{in}$ via step-start switches and a charging resistor (not shown in FIG. 5), as they are well known in the art. The boost converter switches remain disabled until all capacitances are charged to approximately the nominal voltage of $V_{in}$. Only then the boost converter starts to operate. The boost converter is initially operated at constant duty cycle, until the reference voltage is reached across the output capacitance. Only then closed-loop control starts.

Operating conditions of the modules are continuously supervised, and any module is switched off and possibly replaced by another (so far idle) module if a fault condition is detected. In particular, a fault condition is assumed if the booster input voltage or the booster output voltage is outside a predetermined range, or if the output current exceeds a predetermined maximum value. In addition, temperature, desaturation etc. may also be supervised.

The output of each module may be provided with a small output snubber (not shown in FIG. 5) in order to limit the current surge in the module in the case of a short circuit. This snubber should, however, be kept as small as possible in order not to compromise the step response under load changes.

Actual values of capacitances, inductances, resistors etc. will largely depend on the concrete application and on the desired operating point.

The above description is only for illustrative purposes, and a number of modifications can be made without departing from the scope of the present invention. In particular, the boost converter design can be different from the design as described above. In the simplest case, a single converter switch may be used in conjunction with a single choke inductance, a single diode and a single output capacitor, as it is well known in the art and illustrated schematically in the box symbolizing module 40 in FIG. 6. Different controller types than PI controllers may be employed, such as PID controllers. All diodes (acting as passive switches) may be replaced by active switching elements such as transistors if desired. The rectifier circuit may be designed differently, e.g., as an actively controlled thyristor rectifier circuit. Instead of single-quadrant output switching circuits, as in the above-described embodiment, which allow only for unipolar voltage and unidirectional current, also two-quadrant output switching circuits allowing for bipolar voltages at unidirectional current or for unipolar voltage at bidirectional currents or even four-quadrant output switching circuits allowing for arbitrary sign of both output voltage and output current may be employed. Two-quadrant switching may be useful, e.g., for inverse voltage operation to reduce currents after a short circuit has occurred, or for driving capacitive loads such as a control electrode of a vacuum tube. Suitable output switching circuits for two-quadrant or four-quadrant operation are disclosed, e.g., in EP 2 099 127 A1, in particular in its FIGS. 5-7, and the disclosure of that document is incorporated herein by reference in its entirety for teaching suitable output switching circuits for two- and four-quadrant operation. Suitable output switching circuits and modes of operation of two- and four-quadrant output switching circuits are also disclosed in WO 95/10881 A1 and EP 1 553 686 A1.

In other embodiments, depending on the intended field of use, the boost converter may be replaced by any other form of switched DC-DC converter. This might be a buck converter, a buck-boost converter, a SEPIC etc. Such switched-mode DC-DC converters are well known in the art. The operating principles as outlined above remain the same with such DC-DC converters. In particular, also with other types of DC-DC converters it is possible to regulate the DC link voltage of each module by controlling the DC-DC converter, instead of employing PWM and/or CSM schemes to regulate the total output voltage of the complete power supply.

The proposed power supply may not only be employed as the main power supply of a gyrotron, but may be used in any application which require a stabilized high voltage which is stable even under rapid load changes. Examples include the cathode or anode power supply of any other type of vacuum tube having a control electrode which may rapidly change the current in the tube.

The invention claimed is:

1. A high-voltage power supply, comprising:
a plurality of DC power modules having their outputs connected in a series configuration,
each power module comprising a DC voltage source, a DC-DC converter receiving an input voltage from said DC voltage source and providing a DC link voltage, and an output switching circuit for selectively connecting said DC link voltage to the output of said power module, and
for each DC power module, a feedback control circuit adapted to provide driving signals to the DC-DC converter of said power module to regulate said DC link voltage to a predetermined reference voltage.

2. The high-voltage power supply according to claim 1, comprising at least one current sensor for measuring an output current of said DC power modules, wherein the feedback control circuit is adapted to derive driving signals for the DC-DC converter of each power module taking into account the measured output current.

3. The high-voltage power supply according to claim 1, wherein each power module comprises an input voltage sensor for determining an input voltage of the DC-DC converter of said power module, and wherein the voltage control circuit is adapted to derive driving signals for the DC-DC converter of each power module taking into account the measured input voltage.

4. The high-voltage power supply according to claim 2, wherein the DC-DC converter is operable at a variable duty cycle, and wherein the feedback control circuit is adapted to calculate the duty cycle taking into account said measured output current and said measured input voltage.

5. The high-voltage power supply according to claim 1, wherein the DC-DC converter of each power module is a boost converter.

6. The high-voltage power supply according to claim 5, wherein the boost converter of each power module comprises at least two interleaved boost converter circuits adapted to charge a common output capacitance, and wherein the control

| LIST OF REFERENCE SIGNS | | | |
|---|---|---|---|
| 10 | power module | C10, C11 | input capacitors |
| 11 | rectifier circuit | R10, R11 | divider resistors |
| 12 | smoothing capacitance | L10, L11, L20, L21 | choke inductances |
| 13 | output switching circuit | V10, V11, V20, V21 | converter switches |
| 14 | transformer | D10, D11, D20, D21 | converter diodes |
| 2 | gyrotron | C20, C21 | output capacitors |
| FPS | filament power supply | R20 | dissipating resistor |
| MPS | cathode power supply | K40 | dissipating switch |
| BPS | body power supply | V30, V31 | output switches |
| APS | anode power supply | D30, D31 | freewheeling diodes |
| F | filament | 51 | module controller |
| K | cathode | 52 | fiber optic link |
| A | anode | $V_{in}$ | input voltage |
| B | body electrode | $V_{out}$ | DC link voltage |
| C | collector | $V_{tot}$ | total output voltage |
| $V_K$ | cathode voltage | $V_{ref}$ | reference voltage |
| $V_{BK}$ | beam voltage | $V_{diff}$ | voltage difference |
| $V_{AK}$ | anode-cathode voltage | $V_{ctrl}$ | controller output signal |
| $I_K$ | beam current | $I_{out}$ | output current |
| $P_{rf}$ | radiated power | 60 | control circuit |
| 40 | power module | 61 | comparator |
| 41 | rectifier circuit | 62 | PI controller |
| 42 | boost converter | 63 | calculating unit |
| 43 | output switching circuit | 64 | input voltage sensor |
| X10, X11, X12 | input terminals | 65 | output voltage sensor |
| X20, X21 | output terminals | 66 | output current sensor |
| D1 | rectifier diode | | | circuit is operable to operate the boost converter circuits in a synchronous but phase-shifted manner.

7. The high-voltage power supply according to claim 5, wherein the control circuit is operable to operate the boost converter of each power module in discontinuous mode during voltage regulation.

8. The high-voltage power supply according to claim 1, comprising a main control system operable to drive the DC-DC converters of different DC power modules in a synchronous but phase-shifted manner.

9. The high-voltage power supply according to claim 1, comprising a main control system operable to regulate a total output voltage of the power supply during a voltage pulse by only controlling the DC-DC converters of the individual power modules, without applying coarse-step modulation and without applying pulse-width modulation.

10. The high-voltage power supply according to claim 1, comprising a first and a second multi-secondary transformer, the first transformer and the second transformer being configured to provide secondary voltages that are phase-shifted between the transformers so as to improve power ratio.

11. A method of operating a high-voltage power supply having a power module, the method comprising:
setting reference voltage;
measuring and processing actual DC link voltage;
comparing the DC link voltage and the reference voltage to derive a difference signal;
from the difference signal, deriving an actuating signal;
measuring an actual output current and/or actual input voltage;
from the actuating signal, deriving a driving signal for a DC-DC converter, taking into account the measured output current and/or input voltage; and
driving the DC-DC converter by said driving signal to actively control said output voltage.

12. The method of claim 11, wherein a total output voltage of the power supply is regulated by only controlling the DC-DC converter signal without applying pulse-step modulation or pulse-width modulation.

13. Use of the high-voltage power supply according to claim 1 in a gyrotron.

14. A gyrotron comprising a high-power voltage supply according to claim 1.

15. The gyrotron of claim 14, having at least a cathode, a body electrode, and a collector electrode, wherein the high-voltage power supply is connected between the cathode and the collector electrode.

* * * * *